(12) United States Patent
Palmade et al.

(10) Patent No.: US 11,875,215 B2
(45) Date of Patent: Jan. 16, 2024

(54) NEAR-FIELD COMMUNICATION SURFACE AND METHOD FOR LOCATING ON SAID SURFACE

(71) Applicant: CENTILOC, Meyreuil (FR)

(72) Inventors: Romain Palmade, Auriol (FR); Loïc Henninot, La Penne sur Huveaune (FR); Frédérick Bonnin, Rousset (FR)

(73) Assignee: CENTILOC, Meyreuil (FR)

(*) Notice: Subject to any disclaimer, the term of this patent is extended or adjusted under 35 U.S.C. 154(b) by 16 days.

(21) Appl. No.: 17/637,874

(22) PCT Filed: Aug. 26, 2020

(86) PCT No.: PCT/FR2020/051500
§ 371 (c)(1),
(2) Date: Feb. 24, 2022

(87) PCT Pub. No.: WO2021/038167
PCT Pub. Date: Mar. 4, 2021

(65) Prior Publication Data
US 2022/0292271 A1   Sep. 15, 2022

(30) Foreign Application Priority Data
Aug. 29, 2019   (FR) ...................................... 1909528

(51) Int. Cl.
*G06K 7/10*   (2006.01)
(52) U.S. Cl.
CPC ..... *G06K 7/10297* (2013.01); *G06K 7/10316* (2013.01)
(58) Field of Classification Search
CPC ........................ G06K 7/10297; G06K 7/10316
(Continued)

(56) References Cited

U.S. PATENT DOCUMENTS 5,853,327 A    12/1998  Gilboa
9,704,003 B1*   7/2017  Anderson .......... G06K 7/10356
(Continued)

FOREIGN PATENT DOCUMENTS

EP       0737933 A1    10/1996
FR       2860985 A1    4/2005
WO    2013126391 A1    8/2013

OTHER PUBLICATIONS

International Search Report (PCT/ISA/210) with English translation and Written Opinion (PCT/ISA/237) dated Mar. 4, 2021, by the European Patent Office as the International Searching Authority for International Application No. PCT/FR2020/051500.

*Primary Examiner* — Ahshik Kim
(74) *Attorney, Agent, or Firm* — BUCHANAN INGERSOLL & ROONEY PC

(57) ABSTRACT

The invention relates to a near-field communication surface intended to communicate with at least one electronic tag. The surface comprises a plurality of antennas, each antenna having a position along an axis, a circuit for reading electronic tags that is connected to said antennas in order to supply them with power and communicate with said electronic tag, and a processing unit controlling the antennas and the circuit for reading electronic tags. The processing unit is configured to activate just one antenna at a time and the reading circuit in order to communicate with said at least one electronic tag, and to locate a position of the electronic tag along the axis according to a number of responses or to a response time from the electronic tag. The invention also relates to the locating method.

14 Claims, 13 Drawing Sheets

(58) Field of Classification Search
USPC .......................................................... 235/451
See application file for complete search history.

(56) References Cited

U.S. PATENT DOCUMENTS

| | | |
|---|---|---|
| 10,090,888 B2 | 10/2018 | Lefevre et al. |
| 2011/0278947 A1* | 11/2011 | Hennig .................... H01Q 7/00 |
| | | 307/104 |
| 2017/0161531 A1* | 6/2017 | Komaki ................ H04B 5/0062 |
| 2019/0036208 A1* | 1/2019 | Yamagishi ......... G06K 7/10297 |
| 2019/0146051 A1 | 5/2019 | Seitz et al. |

* cited by examiner

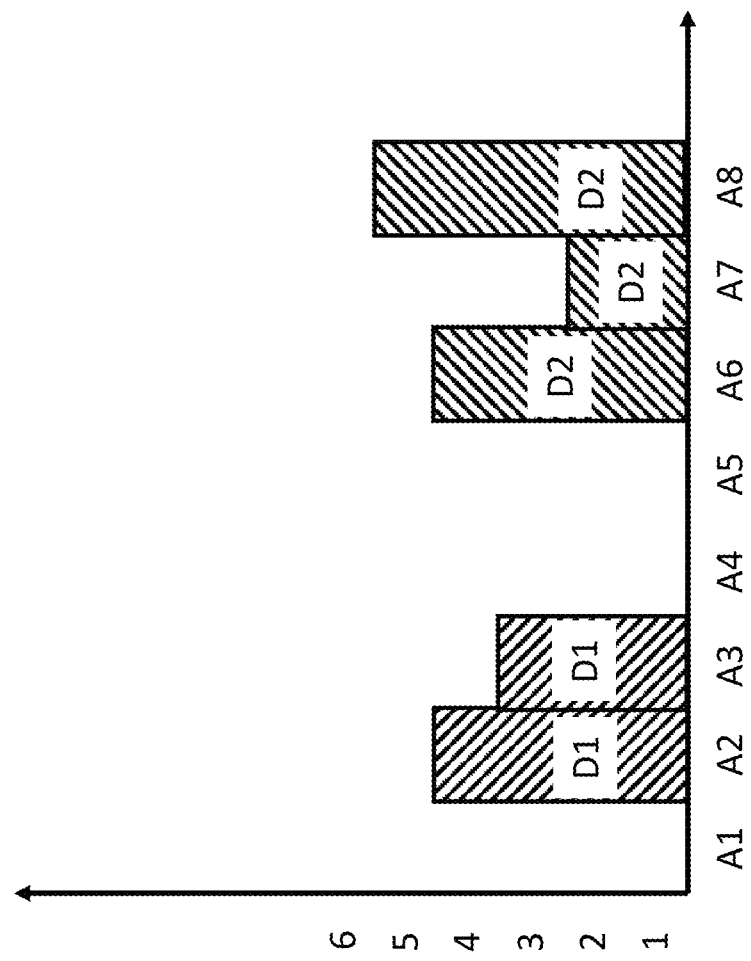

NEAR-FIELD COMMUNICATION SURFACE AND METHOD FOR LOCATING ON SAID SURFACE

TECHNICAL FIELD

The present invention relates to a near-field communication surface and to a method for locating on said surface. The invention makes it possible to locate, on a near-field communication surface, one or more electronic ID tags or devices placed on said surface.

TECHNOLOGICAL BACKGROUND

Automatic tracking of an object in a given zone can be achieved in various ways. Regarding electronic antitheft, it is known to position electromagnetic terminals at store exits, and to fit products with an antitheft device comprising a resonant circuit that is tuned to the frequency of the electromagnetic field of said terminals. As soon as an antitheft device is placed in the field produced by the electromagnetic terminals, said device begins to resonate and creates significant disturbance in the electromagnetic field. This disturbance has been found to be easily detectable, and makes it possible to locate an antitheft device present in a specified zone. However, a tracking method of this kind does not make it possible to exactly identify an object associated with said device.

Two more recent technologies allow for more precise identification of an object. The RFID (Radio Frequency Identification) and NFC (Near Field Communication) technologies use an electronic chip coupled to an antenna which makes it possible to communicate with a reader while using the electric or magnetic field produced by the reader for supplying power to the electronic chip. These two technologies make it possible to send an identifier, which is generally unique, to a reader, from the moment that the identification object is located in the field of communication of the reader, making it possible to precisely identify an object in a determined region, without the identification object or the electronic tag having an intrinsic energy source. RFID technology uses an electric field which makes it possible to communicate, at a distance of a few meters, with one or more identification objects, without making it possible to precisely locate an object. NFC technology uses a magnetic field which makes it possible to communicate a few centimeters from the reader.

Among the object locating applications, there are particular demands which require a high degree of locating and object identification accuracy. By way of example, in the field of interactive games there is a need to track game pieces on a game board. The U.S. Pat. No. 5,853,327 and the patent application EP-A-0 737 933 disclose a game board using a matrix of crisscrossed magnetic antennas, and game pieces comprising resonant circuits tuned to different frequencies. By virtue of frequency scanning performed successively with each antenna, it is possible to locate each game piece positioned on the board. A system of this kind requires specific resonant circuits for each piece to track on the game board.

The application FR-A-2 860 985 disclosed the use of a game board comprising a matrix of NFC technology readers, each covering a very small portion of the board, in order to track an electronic tag located there. In order to achieve accuracy in the positioning, it is necessary to reduce the size of each antenna in order to position the largest possible number of them. Furthermore, the number of readers is proportional to the number of antennas, which is relatively expensive.

The U.S. Pat. No. 10,090,888 also uses NFC technology, but together with crisscrossed antennas, which makes it possible to reduce the number of antennas and readers. Furthermore, in order to refine the position with respect to an antenna, said patent discloses measuring the modulation rate implemented by the electronic tag in order to extract therefrom a relative distance. A method of this kind is relatively complex to develop, and can thus prove to be fairly expensive if a high degree of locating accuracy is desired.

In terms of application, there is also a need for tracking an object on a shelf or a display in a store. This type of application aims to alert the storekeeper when a display is empty, so that it can be restocked. Generally, this type of application makes do with simple detectors for detecting the presence of objects, which have the disadvantage of providing incorrect information when one or more products are replaced by a customer in an incorrect location. Solutions of the RFID type also exist for this type of application, in particular in order to assure stock management, but nonetheless, the RFID solutions do not allow for a high degree of accuracy regarding the exact location of the products on a display or in a set of shelves.

There is therefore a need to make it possible to precisely track, on a game board or on a display, a piece or a product, at a high degree of accuracy and a low cost.

SUMMARY OF THE INVENTION

The invention proposes improving a near-field communication surface provided with a plurality of antennas. The invention implements successive interrogation of one or more electronic ID tags by means of each of the antennas. The responses obtained from the electronic ID tags are then used to determine the position of said electronic ID tags on said communication surface. In order to simplify the locating method implemented by said communication surface, one method implemented makes use either of counting a number of responses emitted by the electronic ID tags, or of a response period thereof, in order to determine the respective positions of said electronic ID tags.

According to a first embodiment, the invention proposes a near-field communication surface intended to communicate with at least one electronic ID tag. Said surface comprises a first plurality of antennas, at least one circuit for reading electronic tags, and a processing unit. Each antenna in the first plurality of antennas has a position according to a first axis which corresponds to the maximum flux of the antenna according to said first axis. The at least one circuit for reading electronic tags is connected to said antennas in order to supply said antennas with power and communicate with said at least one electronic ID tag. The processing unit controls the antennas and the at least one circuit for reading electronic tags, and is arranged to activate just one antenna at a time and said at least one reader circuit in order to communicate with said at least one electronic ID tag. The processing unit is configured to send commands to at least one electronic ID tag by means of each of the antennas in order to locate a position of said at least one electronic ID tag along the first axis according to a number of responses or to a response time of said at least one electronic ID tag.

Preferably, when the number of responses is used for locating the electronic ID tag, the processing unit can be configured to send a predetermined number of commands to the at least one electronic ID tag via the at least one reader circuit and each of the antennas; to count the number of responses received in response by each antenna; and to calculate the position of the at least one electronic ID tag by averaging the positions of the antennas weighted by the number of responses received by each antenna.

According to a variant, the processing unit can be configured to control the transmission power of said reader circuit such that the predetermined number of commands is sent by means of a predetermined number of transmission power.

Preferably, when the response time is used for locating the tab, the processing unit may be configured to send at least one command to the at least one electronic ID tag, having the same transmission power, via the at least one reader circuit and each of the antennas; to measure the response time of said at least one electronic ID tag for each antenna; and to calculate the position of the at least one electronic ID tag according to a difference between the measured response time and an expected response time.

Preferably, the processing unit may be configured to calculate the position of the at least one electronic ID tag by averaging the positions of the antennas weighted by the inverse of a difference between the measured response time and the expected response time.

In order to allow for locating the tag in two dimensions, the communication surface may further comprise a second plurality of antennas, each antenna having a position according to a second axis which corresponds to the maximum flux of the antenna according to said second axis, the second axis being secant to the first axis, said second plurality of antennas being connected to the at least one circuit for reading electronic tags and controlled by the processing unit. The processing unit may be configured to locate a position of said at least one electronic ID tag along the second axis according to a number of responses or to a response time of said at least one electronic ID tag.

According to a variant, the antennas of the first plurality may be elongate in shape according to the second direction, and the antennas of the second plurality may be elongate in shape according to the first direction, said first and second pluralities of antennas covering a surface area that is substantially equal to a surface area of said surface and being superimposed, thus making it possible to locate the at least one electronic ID tag over the entirety of said surface according to the first and the second axis.

In order to avoid disturbances in the measurements, each antenna may comprise at least one shunt switch which short-circuits the antenna when it is closed. When an antenna is selected, the at least one shunt switch may be open and, when an antenna is not selected, the at least one shunt switch may be closed.

In order to reduce the cost of the surface, the at least one reader circuit may comprise a single modulation and demodulation circuit which is connected to each antenna of the first and/or second plurality of antennas. Each antenna may comprise two connector switches for connecting it to the single reader circuit. When an antenna is selected, the connector switches may be closed and, when an antenna is not selected, the connector switches may be open.

According to a second embodiment, the invention proposes a method for locating an electronic ID tag on a near-field communication surface, said surface comprising a plurality of antennas, each antenna having a position according to an axis which corresponds to the maximum flux of the antenna according to said axis, and at least one circuit for reading electronic tags that is connected to said antennas in order to supply said antennas with power and communicate with said electronic ID tag. The method comprises the steps consisting in:

sending a command to the electronic ID tag by means of a selected antenna from the plurality of antennas.

receiving a response from the electronic ID tag and memorizing the response or the lack of response of the tag, by the selected antenna, repeating the steps consisting in sending a command and receiving a response, until each of the plurality of antennas has sent at least one command, calculating a position of the electronic ID tag according to a number of responses or to a response time of the electronic tag.

According to a first embodiment, the steps consisting in sending a command and receiving a response may be repeated until each of the plurality of antennas has sent a predetermined number of commands to the electronic ID tag. The step consisting in receiving a response may count the number of responses received. The step consisting in calculating the position of the electronic ID tag may determine the position of the electronic ID tag by averaging the positions of the antennas weighted by the number of responses received.

In a variant, the predetermined number of commands may be sent by means of a predetermined number of transmission power.

According to a second embodiment, the step consisting in receiving a response may measure the response time of said electronic ID tag. The step consisting in calculating the position of the electronic ID tag may determine the position of the electronic ID tag according to a difference between the measured response time and an expected response time.

In a variant, the step consisting in calculating the position of the electronic ID tag may calculate an average of the positions of the antennas weighted by the inverse of a difference between the measured response time and the expected response time.

BRIEF DESCRIPTION OF THE FIGURES

The invention will be better understood and other features and advantages thereof will become dearer from reading the following description of particular embodiments of the invention, given by way of illustrative and non-limiting example and with reference to the accompanying drawings, in which:

FIG. 13 shows measurements of response times for electronic tags, making it possible to locate the electronic tags according to the method of FIG. 12.

DETAILED DESCRIPTION

Figure 1:
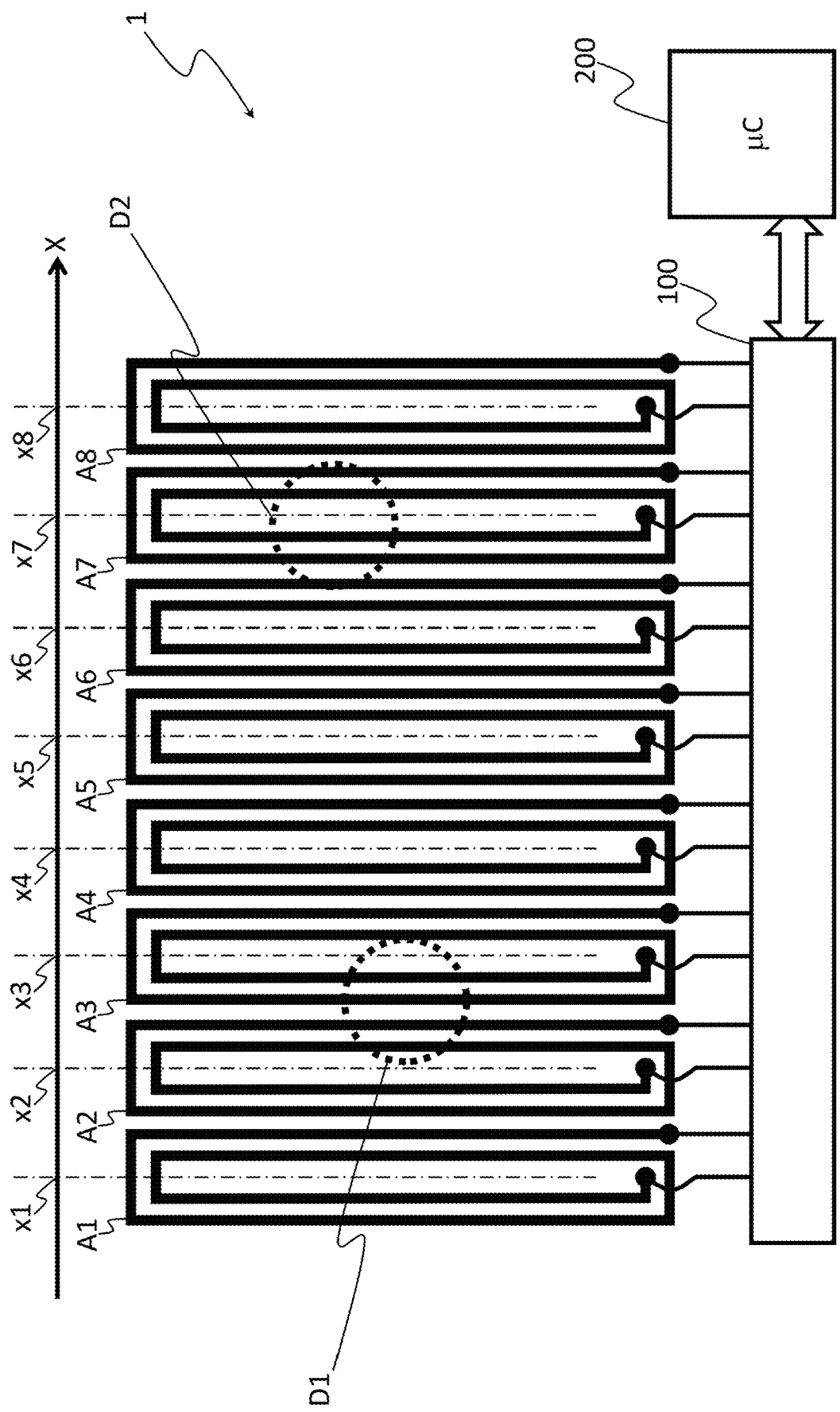
FIG. 1 shows a first embodiment of a communication surface comprising a network of antennas that is compatible with the invention.

By "near field communication," the present document refers to NFC technology that is limited to a few centimeters, and uses antennas implemented by means of conductive loops forming half-transformers both on the reader side and on the electronic tag side. The communication thus implemented is achieved by means of a magnetic field which couples the transmission antenna of the reader and the antenna for recovering energy from an electronic tag.

By "electronic tag," the present document refers to an identification device comprising an electronic chip coupled to an antenna which forms a coil and powers itself by means of the magnetic field created by the reader. An identification device of this kind is generally in the form of a tag which can be easily fixed on a number of types of packaging or products. Nonetheless, the invention is not limited to a form factor of the "tag" type, and may for example be in the form of a grain of rice or any other form of electronic device.

Before explaining in detail the functioning of the locating of a tag, a reminder of the functioning of near-field communication between a reader and an electronic tag is first required. The reader comprises an antenna which has one or more turns and is tuned to a resonant frequency which corresponds to the frequency of the magnetic field emitted, for example 13.56 megahertz. The electrical current flowing through the turns of the antenna of the reader creates a magnetic field which radiates in the vicinity of the antenna. The electronic tag comprises an antenna which has one or more turns and is tuned to the magnetic field emitted by the reader. When the electronic tag is in the magnetic field of the reader, the antenna of the electronic tag begins to resonate and transforms the magnetic field which it receives. If the magnetic field is sufficiently great, the antenna of the electronic tag can supply power to the chip of said tag. The communication between the reader and the electronic tag is achieved by modulation of the magnetic field. On the reader side, the modulation of the field is achieved by modulating the current sent to the antenna, and thus the field emitted. On the electronic tag side, the modulation is achieved by tuning and detuning the antenna of the electronic tag by performing modulated disturbance of the magnetic field, also referred to as retro-modulation. The modulated disturbance of the magnetic field results in modulation of the current flowing in the antenna of the reader, which this can demodulate. For further details, a person skilled in the art may refer to the standard ISO14443 which defines the functioning of near-field communications.

In order for the communication to be established between the reader and the electronic tag, it is necessary for the electronic tag to be sufficiently close to the reader to receive a magnetic field of sufficient power to supply power to the chip of the electronic tag. The distance allowing for the communication between the reader and the electronic tag depends on the dimensioning of the antennas of the reader and of the antenna of the electronic tag, but also on the transmission power of the reader. Using a low transmission power on the side of the reader means that an electronic tag can be detected only if it is very close to the transmission antenna, or indeed only if the electronic tag is superimposed on the transmission antenna.

It is using this principle which makes it possible to locate an electronic tag on a communication surface having a plurality of readers on said surface.

FIG. 1 shows a first embodiment of a communication surface 1 which is intended for locating one or more electronic tags according to a single axis X. A communication surface 1 of this kind may be a game board, a display, a shelf, or any other flat element intended for receiving electronic tags or products comprising electronic tags. For this purpose, the communication surface 1 comprises a plurality of coplanar antennas A1 to A8 which are placed side-by-side according to the axis X. The antennas are preferably aligned according to the axis X. The communication surface 1 also comprises a reader block 100 connected to the antennas A1 to A8, and a processing unit 200 connected to the reader block 100. The processing unit 200 furthermore comprises a communication interface (not shown) for being able to transmit locating information to a remote computer (not shown).

Each antenna A1 to A8 comprises one or more turns which are intended for emitting a magnetic field when an electric current passes therethrough. The electric current flowing in each antenna A1 to A8 is provided by the reader block 100, under the control of the processing unit 200. When an antenna A1 to A8 is supplied with power by the reader circuit 100, a magnetic field is emitted by said antenna A1 to A8 and the intensity of the magnetic field is at a maximum at the center of the turns thereof. The maximum intensity of the magnetic field of each antenna A1 to A8 projected on the axis X defines the position of said antenna A1 to A8 on the axis X. Thus, each antenna A1 to A8 is associated with a position x1 to x8 on the axis X.

The operating principle of a near-field communication system comprising locating of an electronic tag consists in controlling the power supply of each antenna A1 to A8, such that a single selected antenna A1 to A8 emits a magnetic field at a given moment. If an electronic tag placed on the communication surface 1 is sufficiently close to a selected antenna A1 to A8, then communication between the selected antenna A1 to A8 and the electronic tag is established. Depending on the shape and the position of the antenna of the electronic tag, and also depending on the transmission power, one or more of the antennas A1 to A8 can communicate with said tag. More details on how to determine the position of the electronic tag will be given below.

Figure 2:
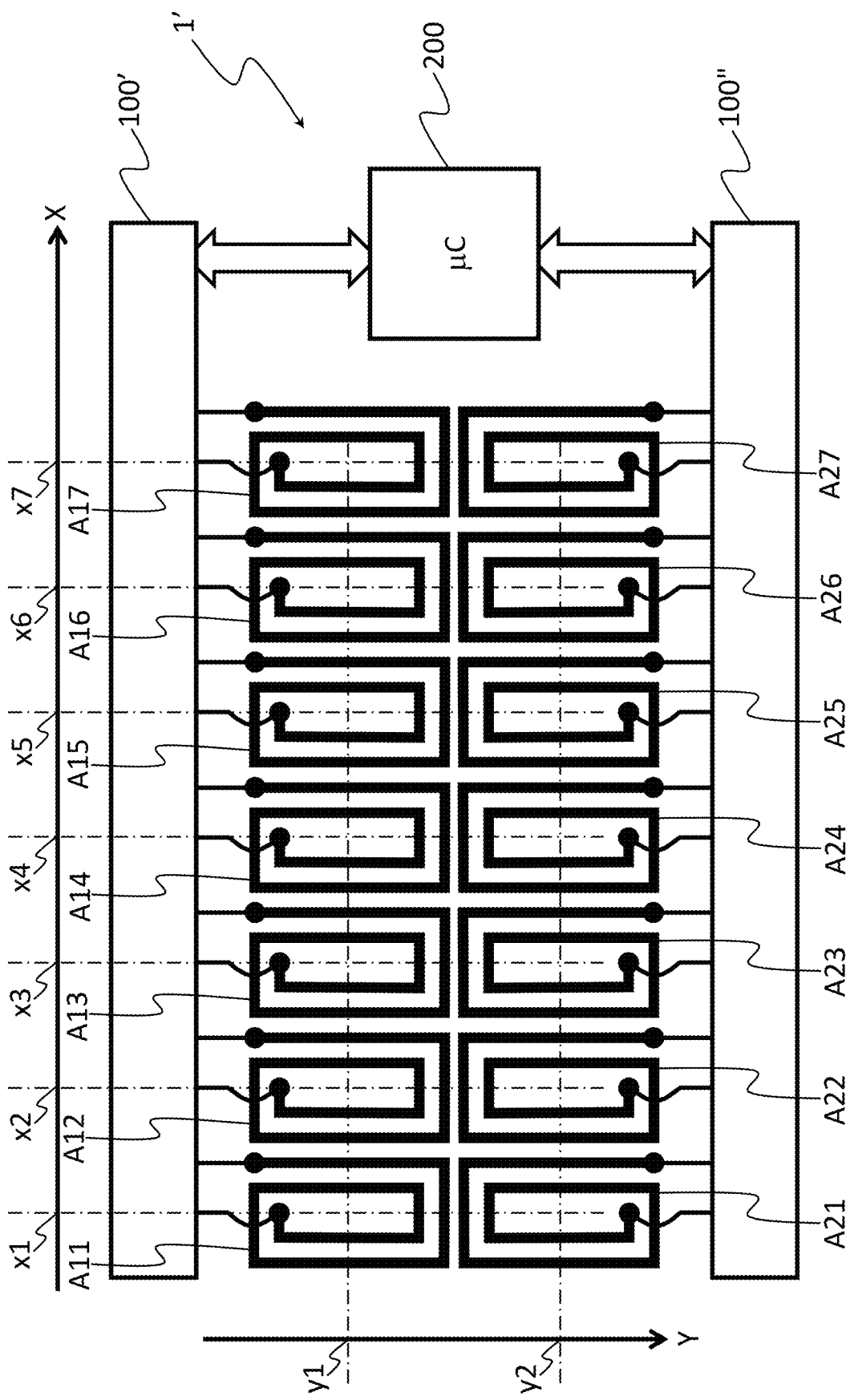
FIG. 2 shows a second embodiment of a communication surface comprising a network of antennas that is compatible with the invention.

In order to be able to locate, in two dimensions, the position of a tag on a substantially flat communication surface, antennas which make it possible to track a tag according to two secant and preferably perpendicular axes are required. FIG. 2 shows a second embodiment of a communication surface 1' which is intended for locating one or more electronic tags according to a first axis X and a second axis Y, which is coplanar and for example orthogonal with respect to the first axis. For this purpose, the communication surface 1' comprises a plurality of antennas A11 to A27 which are arranged in a matrix comprising antennas arranged in a row according to the first axis X and in a column according to the second axis Y. The communication surface 1' also comprises two reader blocks 100' and 100" which are connected to the antennas A11 to A17 on the one hand, and A21 to A27 on the other hand. More simply, said second embodiment amounts to a duplication of the first embodiment, as many times as there are rows of antennas. The communication surface 1' also comprises a processing unit 200 which is connected to the reader blocks 100 in order to control said blocks and to select a transmission antenna.

The point of maximum intensity of the magnetic field of each antenna A11 to A27 projected on the first axis X defines the position of said antenna A11 to A27 on the first axis X. The point of maximum intensity of the magnetic field of each antenna A11 to A27 projected on the second axis Y defines the position of said antenna A11 to A27 on the second axis Y. Thus, each antenna A11 to A27 is associated with a position x1 to x7 on the first axis X, and a position y1 to y2 on the second axis Y.

The principle of locating an electronic tag in said second embodiment is the same as in the first embodiment. However, the communication achieved between each of the antennas A11 to A27 and the electronic tag is to be used for determining the position of the electronic tag on each of the first and second axes X and Y, as will be explained later in the description.

Figure 3:
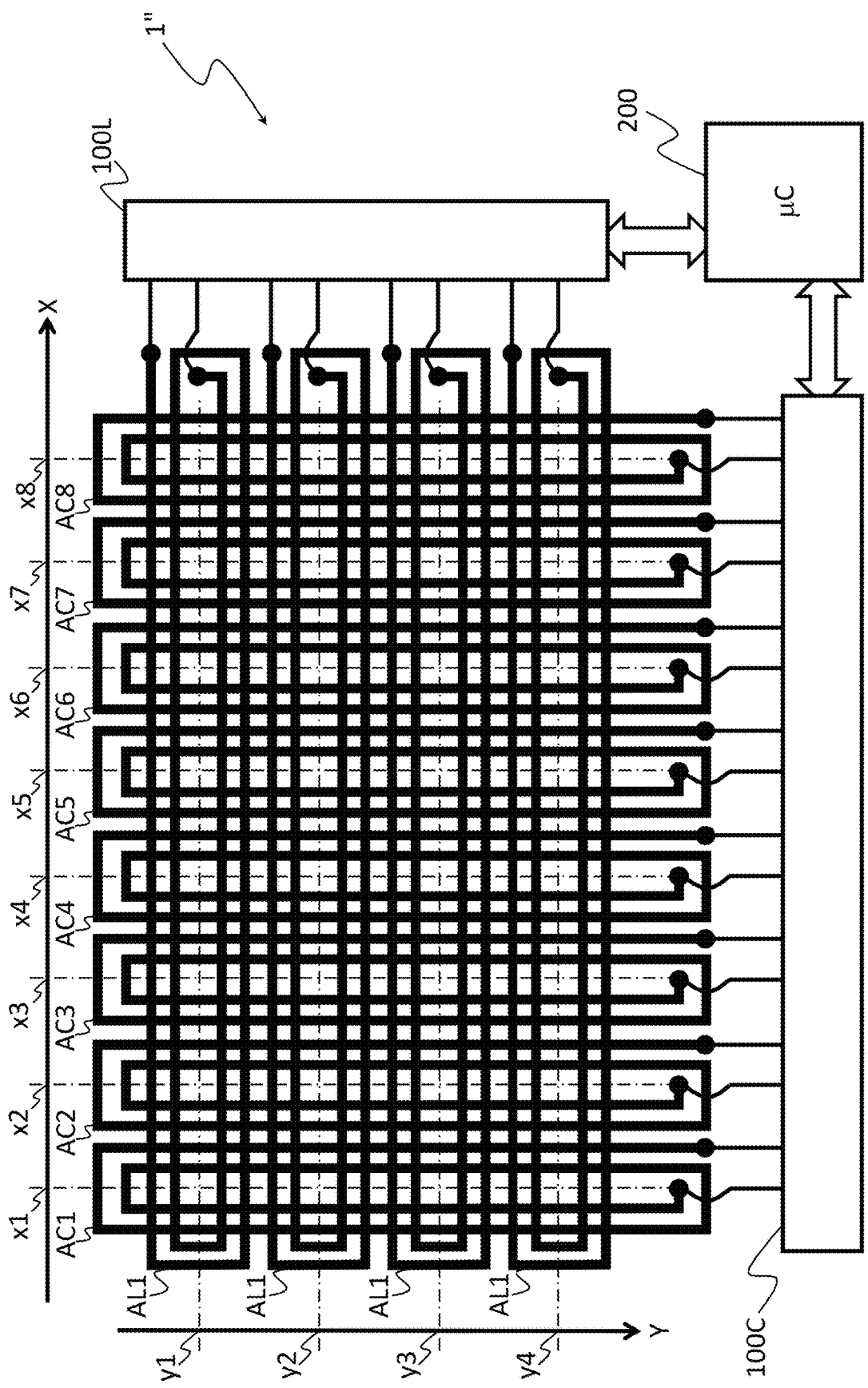
FIG. 3 shows a third embodiment of a communication surface comprising a network of antennas that is compatible with the invention.

FIG. 3 shows a third embodiment of a communication surface 1" which is intended for locating one or more electronic tags according to a first axis X and a second axis Y which are coplanar and secant. For this purpose, the communication surface 1" comprises a first plurality of antennas AC1 to AC8 which are positioned side-by side according to the first axis X, and a second plurality of antennas AL1 to AL4 which are positioned side-by-side according to the second axis Y. The first plurality of antennas AC1 to AC8 and the second plurality of antennas AL1 to ALA are superimposed and occupy substantially the same surface area which corresponds to the surface area of the communication surface 1". The communication surface 1" also comprises a first reader block 100L which is connected to the first plurality of antennas AC1 to AC8, a second reader block 100C which is connected to the second plurality of antennas AL1 to AL4, and a processing unit 200 which is connected to the first and second reader blocks 100L and 100C. More simply, said third embodiment amounts to a duplication of the first embodiment, superimposing the antennas which are oriented according to the two axes X and Y.

For the first plurality of antennas AC1 to AC8, the maximum intensity of the magnetic field of each antenna AC1 to AC8 projected on the first axis X defines the position of said antenna AC1 to AC8 on said first axis X. Thus, each of the first plurality of antennas AC1 to AC8 is associated with a position x1 to x8 on the first axis X. For the second plurality of antennas AL1 to AL4, the maximum intensity of the magnetic field of each antenna AL1 to AL4 projected on the second axis Y defines the position of said antenna AL1 to AL4 on said second axis Y. Thus, each of the second plurality of antennas AL1 to AL4 is associated with a position y1 to y4 on the second axis Y.

The principle of locating an electronic tag in said third embodiment corresponds to a duplication of the first embodiment according to two different axes. Nonetheless, the locating performed for the first and second pluralities of antennas AC1 to AC8, and AL1 and AL4 must be performed successively, as will be explained later in the description.

Figure 4:
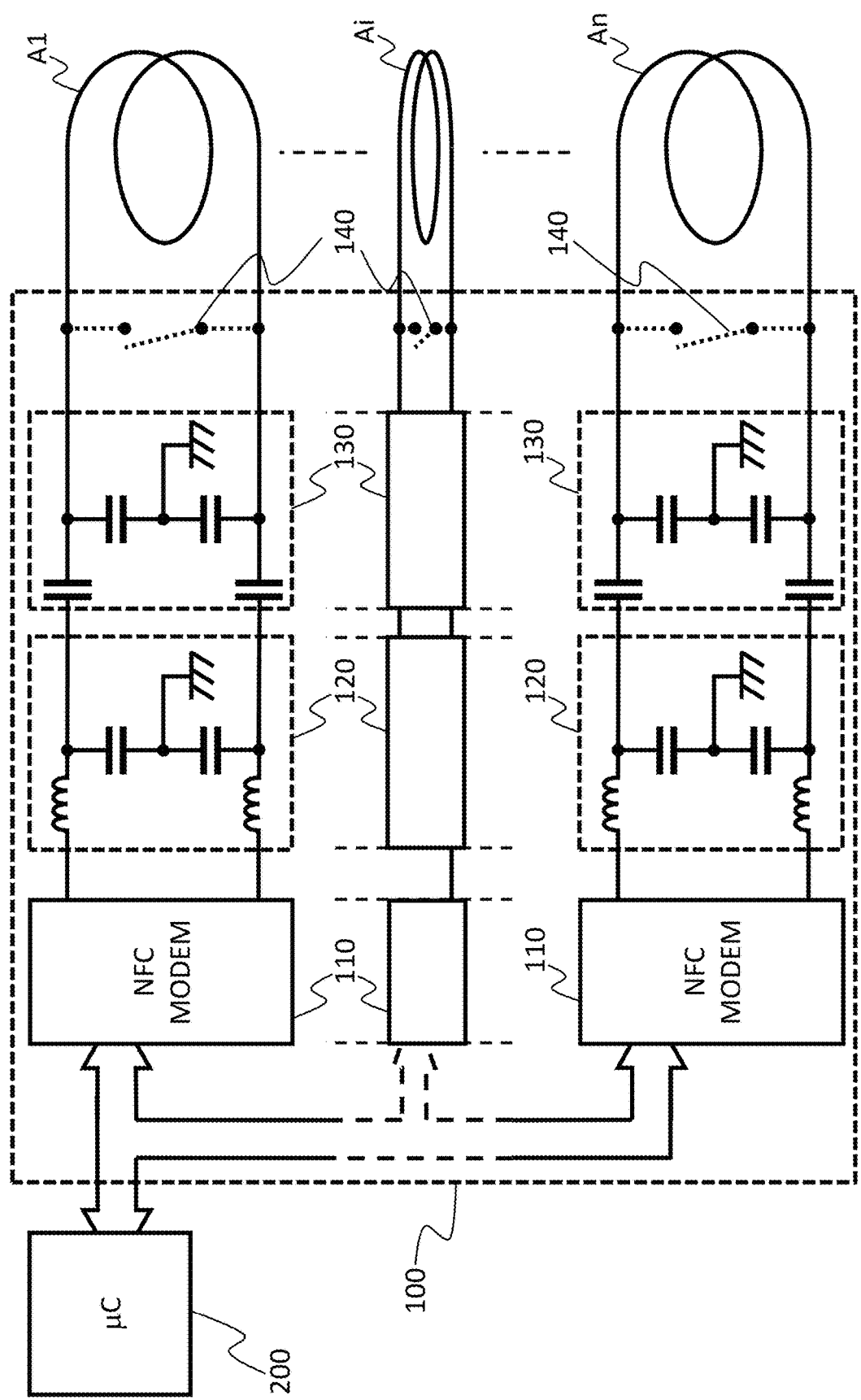
FIG. 4 first block and wiring diagram which can be used according to the invention together with the networks of antennas of FIGS. 1 to 3.
Figure 5:
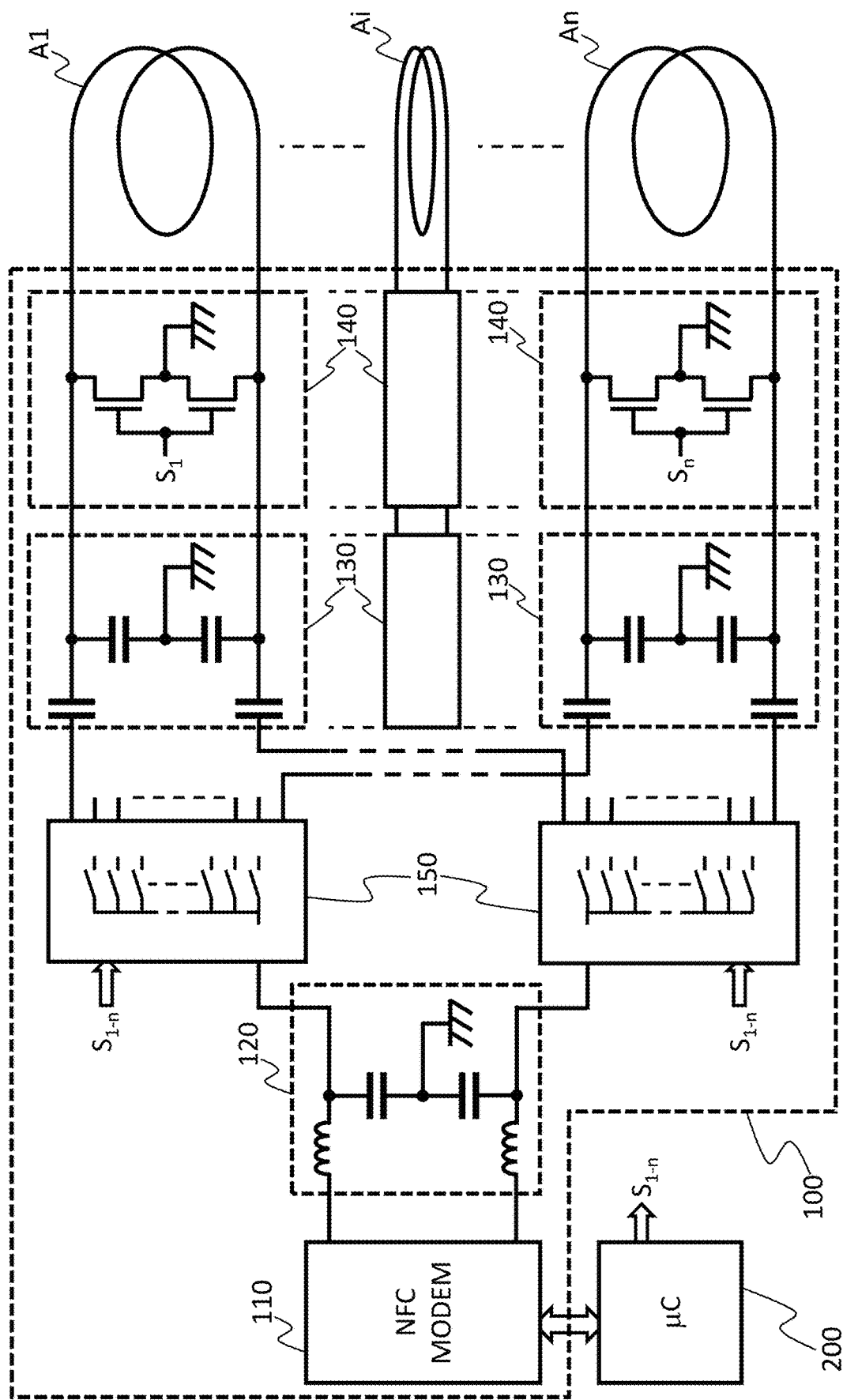
FIG. 5 is a second block and wiring diagram which can be used according to the invention together with the networks of antennas of FIGS. 1 to 3.

Whatever the embodiment of the communication surface 1, 1' or 1" implemented, the selection of the antenna A1 to A8, A11 to A27, AC1 to AC8, or AL1 to AL4 is performed jointly by the reader block 100, 100', 100", 100L or 1000 controlled by the processing unit 200. FIGS. 4 and 5 show details of two possible embodiments of the reader block. In order to simplify the representation, FIGS. 4 and 5 re-use the reference signs indicated in FIG. 1, but could just as well re-use the reference signs of FIG. 2 or 3. Furthermore, only three antennas are shown, but a person skilled in the art will understand that some of the circuit is not shown, with the aim of simplification, and that it is sufficient to duplicate the elements shown.

In FIG. 4, the reader block 100 comprises, for each antenna A1, Ai or An, a modulation and demodulation circuit (MODEM) 110, an EMC filter 120 (ElectroMagnetic Compatibility), and a tuner circuit 130. The tuner circuit 130 is coupled to the antenna A1, Ai or An in order to form a resonant circuit that is tuned to the frequency of the magnetic field. The EMC filter 120 is positioned between the MODEM circuit 110 and the tuner circuit 130. The EMC filter 120 is implemented for example by means of two LC circuits forming a bandpass filter centered on the frequency of the magnetic field, in order to allow only a narrow frequency band, centered on the frequency of the magnetic field, to pass through. The EMC circuit 120 suppresses possible modulation images, and also the interference received by the antenna. The tuner circuit 130, positioned between the antenna A1 to An and the EMC filter 120, is made up of capacitors which have the function of forming, together with the antenna A1 to An, a circuit that resonates at the frequency of the magnetic field. The dimensioning of the components of the EMC circuit 120 and of the tuner circuit 130 is carried out jointly, in order for the assembly formed by the antenna A1 to An, the tuner circuit 130, and the EMC circuit, to itself be a circuit that resonates at the frequency of the magnetic field. The MODEM circuit 110 is the active element which provides the carrier frequency of the magnetic field, modulates said field when a message is to be sent, and demodulates the messages emitted by the electronic tag and received by the antenna. The MODEM circuits 110 associated, respectively, with the antennas A1 to An are connected to the processing unit 200 via a communication bus.

The processing unit 200 is for example a microcontroller or a microprocessor comprising a volatile memory and a non-volatile memory. The non-volatile memory comprises programs which, when executed, make it possible to manage the transmission and reception of messages with an electronic tag, and also to implement a method for locating the electronic tag. The processing unit 200 may select, via the communication bus, a single MODEM circuit 110, such that only the antenna A1 to An associated with the selected MODEM circuit 110 is active. When a MODEM circuit 110 is active, it provides an electric signal to the antenna A1 to An, via the EMC filter 120 and the tuner circuit 130. The electric signal is a variable signal, at the frequency of the magnetic field, which the antenna transforms into a magnetic field. In order to send a message, the processing unit 200 sends a modulation command followed by the binary train to send to the selected MODEM circuit 110. The MODEM circuit 110 encodes the binary train in baseband, then modulates the electric signal provided to the antenna, which has the effect of modulating the magnetic field. When an electronic tag modulates the magnetic field, the selected antenna A1 to An transforms the modulation of the magnetic field into modulation of the electric signal which passes therethrough. The MODEM circuit 110 demodulates the electric signal and decodes a message which it retransmits to the processing unit 200.

When a MODEM circuit 110 and the associated antenna A1 to An thereof are not selected, no transmission is performed by the antenna. Depending on the type of MODEM circuit 110, the outputs of the MODEM circuit 110 can be connected to ground or set to high impedance. If the output of the MODEM circuit 110 is set to high impedance, the antennas adjacent to a selected antenna may begin to resonate due to electromagnetic coupling; such resonance has the effect of increasing the range of the magnetic field of the selected antenna, and improves the communication with an electronic tag. However, the locating of the tag is performed taking into account a range limit of the selected antenna. In order to prevent undesired resonance, it is possible to position a shunt switch 140 in parallel on the antenna A1 to An in order to short-circuit the antenna A1 to An when this is not selected.

FIG. 5 shows an embodiment which uses just one MODEM circuit 110 and one EMC filter 120 for all the antennas A1 to An. An embodiment of this kind is less expensive than the embodiment of FIG. 4. Furthermore, the use of just one MODEM circuit 110 makes it possible to more easily ensure an identical modulation power for each antenna A1 to An in response to a command of the processing unit 200. The EMC filter 120 is connected to the plurality of tuner circuits 130 via two series of connector switches 150 corresponding, for example, to analog multiplexers. The connector switches 150 are controlled by the processing unit 200 by means of n command signals $S_1$ to $S_n$ (also denoted $S_{1-n}$), just one of which is active. One of the command signals $S_{1-n}$ is active to close the connector switches 150 corresponding to the selected antenna A1 to An, the other connector switches 150 remaining open, the antennas A1 to An that are not selected being set to high impedance. In order to prevent coupling, by resonance, of the antennas A1 to An not selected, shunt switches 140 are placed in parallel on each of the antennas A1 to An. The shunt switches 140 are controlled by the same command signals $S_1$ to $S_n$ as the connector switches 150 but in the inverse manner, such that, when an antenna A1 to An is selected, the shunt switch 140 which is associated therewith is open, and when an antenna A1 to An is not selected, the shunt switch 140 which is associated therewith is closed.

A first locating method implemented by the processing unit 200 is described with reference to FIG. 6 and corresponds to a locating method performed on the basis of a number of responses of an electronic tag. When the program corresponding to the method for locating tags is implemented by the processing unit 200, the processing unit initializes the method, in a step 600, by setting two loop indices IB and JB to the value "1." Then, in a step 610, the processing unit 200 selects an antenna corresponding to the index IB to interrogate a tag, for example by means of a REQA command as defined in the standard ISO14443, in order to receive an ATQA response indicating the identification number of the tag. If an ATQA response is received, a step 620, performed by the processing unit 200, memorizes the identifier of the electronic tag which has responded with the index IB which corresponds to the antenna A1 to An which has received said ATQA response. If no ATQA response is received within a reception wait period, then the processing unit 200 memorizes, in step 620, that no tag response is received. The principle implemented in this first embodiment relates to a non-systematic response of the electronic tag. Indeed, since the electronic tag is supplied by the magnetic field, it has to store a certain amount of energy in order to be able to respond. A tag which is not positioned in an optimal manner with respect to the magnetic field may not have sufficient energy to respond systematically to a command.

For this purpose, the method implemented by the processing unit 200 consists in sending, during the step 610, a command using each antenna A1 to An. The processing unit 200 controls the MODEM circuit 110 in order to send a REQA command on an antenna A1 to An at a power which does not allow an electronic tag to respond if said tag is located at a distance greater than a predetermined distance. If the electronic tag is positioned at a distance less than the predetermined distance, the energy received by said tag may not be sufficient for a systematic response, for example if said tag is not positioned in an optimal manner with respect to the selected antenna. During step 620, when an ATQA response is received by an antenna A1 to An, the MODEM circuit 110 transmits the response to the processing unit 200 which identifies the electronic tag in the ATQA response in order to memorize the responses received by each of the antennas A1 to An. The steps 610 and 620 are repeated following incrementation of the index IB, during a step 630, until the index reaches the value "n" corresponding to the number of antennas A1 to An. When the steps 610 and 620 have been performed "n" times, the index JB is incremented in a step 640, and the index IB is reinitialized at the value "1" in order to re-interrogate all the antennas A1 to An. All these steps 610 to 650 are repeated until the index JB reaches a value "p" corresponding to a maximum number of interrogations performed by all the antennas. Thus, each antenna A1 to An has sent p REQA commands, and the ATQA responses, if there are any, have all been memorized by the processing unit 200. The processing unit 200 then performs a step 660 of calculating the position of the tags detected.

According to a variant, the order of selection of the antennas may vary, in order to send REQA commands such that the prior charging conditions of a tag vary. Indeed, a tag which has been charged has a charge-holding capacity for approximately ten microseconds. If the interrogation by an adjacent antenna takes place too quickly, i.e. before the electronic tag has had the time to discharge, then the interrogated tag needs to accumulate less energy than a tag which had not been charged. Varying the order of interrogation may make it possible to escape the phenomenon of residual charge, and thus to reduce the time separating a command being sent by another antenna. In order to vary the order of interrogation, a correspondence table having the indices IB and JB as the input may give an antenna index that is different from the index IB.

By way of example, two electronic tags D1 and D2 are placed on the network of antennas A1 to A8 of FIG. 1, the value "n" being fixed at the value "8." The electronic tag D1 is positioned so as to straddle the antennas A2 and A3, and receives a larger magnetic flux from the antenna A3 than from the antenna A2. The electronic tag D2 is positioned on the antenna A7, so as to be slightly offset towards the antenna A6. The power of the MODEM circuit 110 is fixed by the processing unit 200 such that the predetermined distance is equal to the spacing separating two antennas. The value "p" is for example fixed at the value "10," and the responses received are collected for each antenna A1 to A8.

Figure 7:
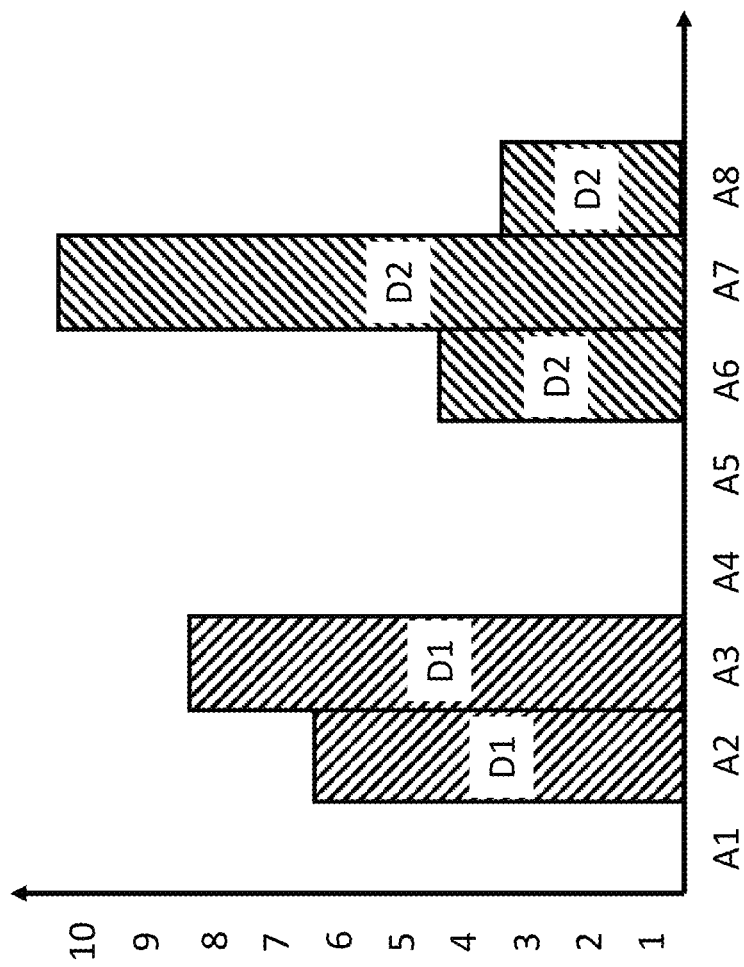
FIG. 7 illustrates counting of responses received, making it possible to locate electronic tads according to the method of FIG. 6.

FIG. 7 graphically shows, by way of non-limiting example, a number of ATQA responses received from said tags D1 and D2. The antenna A2 has received six ATQA responses from the tag D1, and the antenna A3 has received eight ATQA responses from the tag D1. The antenna A6 has received four ATQA responses from the tag D2, the antenna A7 has received ten ATQA responses from the tag D2, and the antenna A8 has received eight ATQA responses from the tag D2. In order to obtain the position of the tag D1 or D2, the processing unit 200 calculates, during step 660, an average of the position of the antennas A1 to A8, weighted by the number of responses received, for example by means of the following formula:

$$x(Dj) = \frac{\sum_{i=1}^{n}(Ri(Dj)*xi)}{\sum_{i=1}^{n}Ri(Dj)} \quad \text{[Math 1]}$$

where $x(Dj)$ corresponds to the position of a tag Dj, n the number of antennas, $Ri(Dj)$ the number of ATQA responses received by an antenna Ai and originating from the tag Dj, and xi the position of the antenna Ai.

By way of example, if the positions of antennas A1 to A8 are spaced apart by four centimeters, and the antenna A1 corresponds to the origin of the X axis, the positions x1 to x8 of the antennas A1 to A8 correspond, respectively, to 0, 4, 8, 12, 16, 20, 24 and 28 centimeters with respect to the origin. Considering the ATQA responses represented in FIG. 6, the application of the above formula gives the position x(D1) at 6.28 centimeters from the origin, and the position x(D2) at 23.76 centimeters from the origin. A method of this kind has a margin of error which depends on the power of the magnetic field, the distance that can separate the surface area of the surface from the position of the tag, the orientation of the tag, and, more generally, the coupling coefficient between an antenna A1 to A8 of the communication surface 1 and an antenna of the electronic tag D1 or D2.

In order to achieve two-dimensional locating of the position of the tag, it is necessary to perform the same operation on the Y axis. For the communication surface T of FIG. 2, the responses of an antenna A11 to A27 must be considered according to the first axis X and according to the second axis Y, in order to calculate a weighted average according to each of the axes. In one embodiment, it is possible to make use of two indices IB, one for the rows and the other for the columns. According to another embodiment, the value "n" may be equal to the total number of antennas, and the antenna is selected by means of a correspondence table, depending on the index IB. Whatever the method of selection, the following formulae can be used, by way of example:

$$x(Dj) = \frac{\sum_{i=1}^{n}\sum_{k=1}^{m}(Rik(Dj)*xi)}{\sum_{i=1}^{n}\sum_{k=1}^{m}Rik(Dj)};$$

$$y(Dj) = \frac{\sum_{i=1}^{n}\sum_{k=1}^{m}(Rik(Dj)*yk)}{\sum_{i=1}^{n}\sum_{k=1}^{m}Rik(Dj)} \quad \text{[math 2]}$$

where $x(Dj)$ corresponds to the position of a tag Dj according to the first axis X, $y(Dj)$ corresponds to the position of the tag Dj according to the second axis Y, n the number of antennas according to the first axis X, m the number of antennas according to the second axis Y, xi the position of an antenna Aik according to the first axis X, yk the position of the antenna Aik according to the second axis Y, and $Rik(Dj)$ the number of ATQA responses received by the antenna Aik placed at position xi and yk, and originating from the tag Dj.

For the communication surface 1" of FIG. 3, the calculation of the position of a tag according to the first axis is performed considering only the responses received by the first plurality of antennas AC1 to AC8, and the calculation of the position of a tag according to the second axis is performed considering only the responses of the second plurality of antennas AL1 to AL4. As above, it is possible to make use of one or two indices 1B in order to scan the selection of antennas. The calculation of the position can, for example, be obtained from the following formulae:

$$x(Dj) = \frac{\sum_{i=1}^{n}(RCi(Dj)*xi)}{\sum_{i=1}^{n}RCi(Dj)}; y(Dj) = \frac{\sum_{k=1}^{m}(RLk(Dj)*yk)}{\sum_{k=1}^{m}RLk(Dj)} \quad \text{[math 3]}$$

where $x(Dj)$ corresponds to the position of a tag Dj according to the first axis X, $y(Dj)$ corresponds to the position of the tag Dj according to the second axis Y, n the number of antennas according to the first axis X, m the number of antennas according to the second axis Y, xi the position of the antenna ACi according to the first axis X, yk the position of the antenna ALk according to the second axis Y, $RCi(Dj)$ the number of ATQA responses received by the antenna ACi placed at position xi and originating from the tag Dj, and $RLk(Dj)$ the number of ATQA responses received by the antenna ALk placed at position yk and originating from the tag Dj.

Thus, it is possible to fairly easily locate an electronic tag placed on a communication surface, by means of the REQA command and the associated ATQA response. The same mechanism can be used together with other commands defined in the standard ISO14443, such as the WUPA command.

Figure 6:
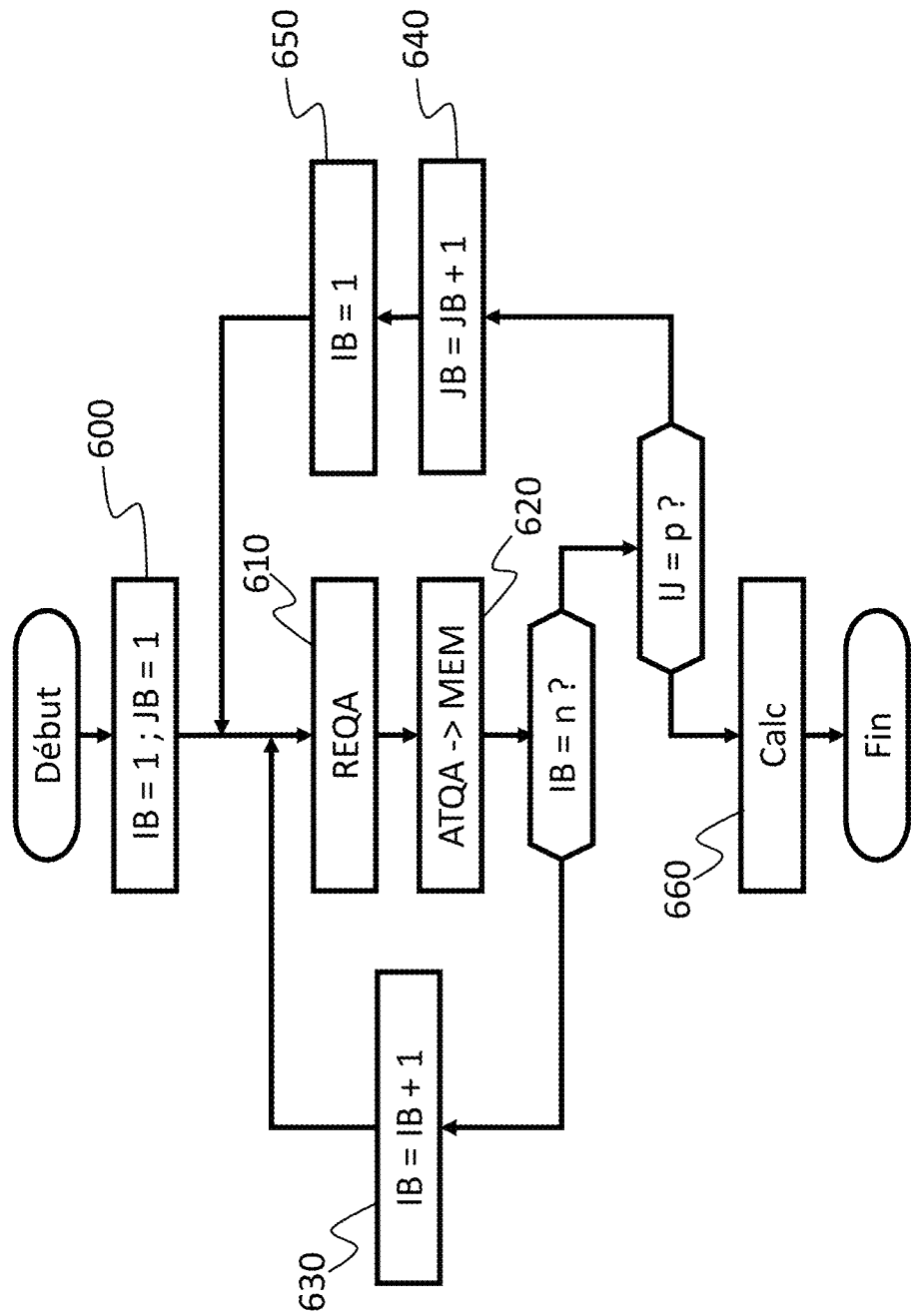
FIG. 6 is a functional flow diagram of a first embodiment of the method for locating electronic tags implemented by said surface, according to the invention.

The locating method of FIG. 6 has been described having just one single electronic tag in the magnetic field of an antenna. It is also possible to apply the locating method when there are a plurality of electronic tags present in the magnetic field of one antenna. Steps 610 and 620 have to be adapted as a result. In the case of a plurality of tags being present in the field of one antenna of the communication surface, the ATQA response indicates a start of an identifier that is common to all the tags present in the magnetic field of the antenna, which have sufficient energy to respond. When a tag detects that the ATQA response does not comply with what it modulates, which is the case as soon as a plurality of tags modulate the same bit differently, the electronic tag stops the modulation. The processing unit 200 receiving, via the MODEM circuit 110, an incomplete identifier thus performs an anticollision loop as defined in the standard ISO14443, replacing steps 610 and 620. The processing unit 200 sends a selection command SEL containing the start of the identifier received, with an additional bit fixed at 1 then at 0 in order to select the lowest number of electronic tags. If just one tag is selected, the SAK response sent by the tag contains the identifier of the tag. If a plurality of tags are selected, the SAK response is incomplete, and the selection operation is repeated on another bit of the identifier. The selection operation is thus repeated until there has been complete identification of all the tags present in the field of the antenna. The identifiers of the detected tags are memorized by the processing unit 200 during the progression of the anticollision loop. For further details on the anticollision mechanism, a person skilled in the art may refer to the standard ISO14443.

The method described above uses a low power of the MODEM circuit 110 which is, for example, limited to a distance separating two antennas. In the event of the communication surface being used as a product display, it is possible for the antenna of the electronic tag to be placed on the top of some packaging, and thus a few centimeters from the display. In order to allow for the detection of a tag that is further away, it is possible to use a higher transmission power, which makes it possible to read an electronic tag for example at a distance that is twice that indicated above. The use of a more powerful magnetic field may bring about detection by a much larger number of antennas if the electronic tag is close to the surface. In particular, the number of antennas receiving ATQA responses to all the REQA commands may increase, which may hinder the accuracy thereof. In order to improve the scope of detection of electronic tags without losing accuracy, the method described above is modified using a variable power.

Figure 8:
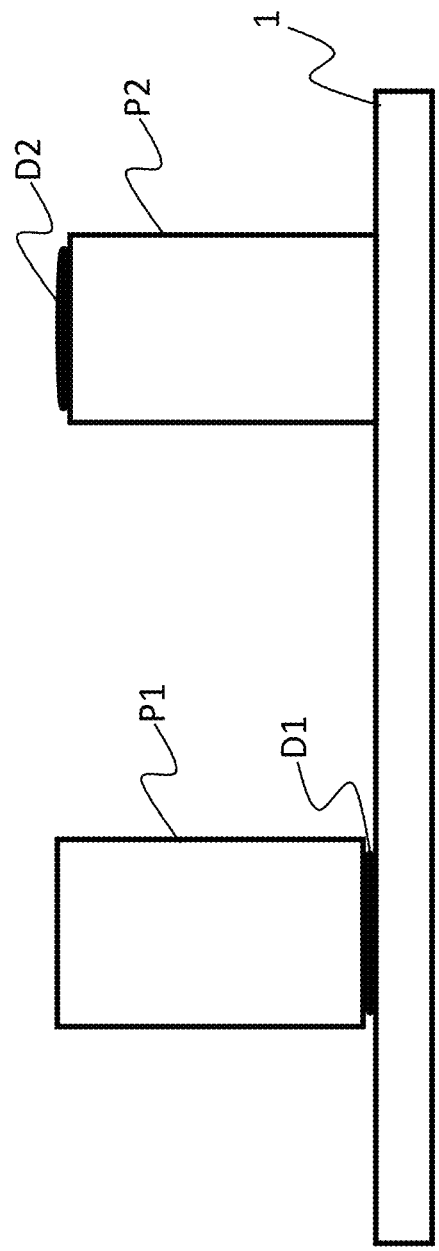
FIG. 8 shows products arranged on a communication surface.

FIG. 8 shows the communication surface 1 used as a display for products, on which two products P1 and P2 have been placed. Each of the products P1 and P2 comprises an electronic tag D1 and D2, respectively, on the base of the packaging thereof. Nonetheless, the product P2 has been inadvertently placed upside-down on the communication surface 1. Thus, the tag D2 is positioned at a distance from said surface 1. In terms of positioning on the communication surface 1, it is assumed that the placement of the tags D1 and D2 is similar to that shown in FIG. 1. By way of example, it is considered that the distance between the communication surface 1 and the tag D2 is between one and two times the distance separating two antennas A1 to A8.

Figure 9:
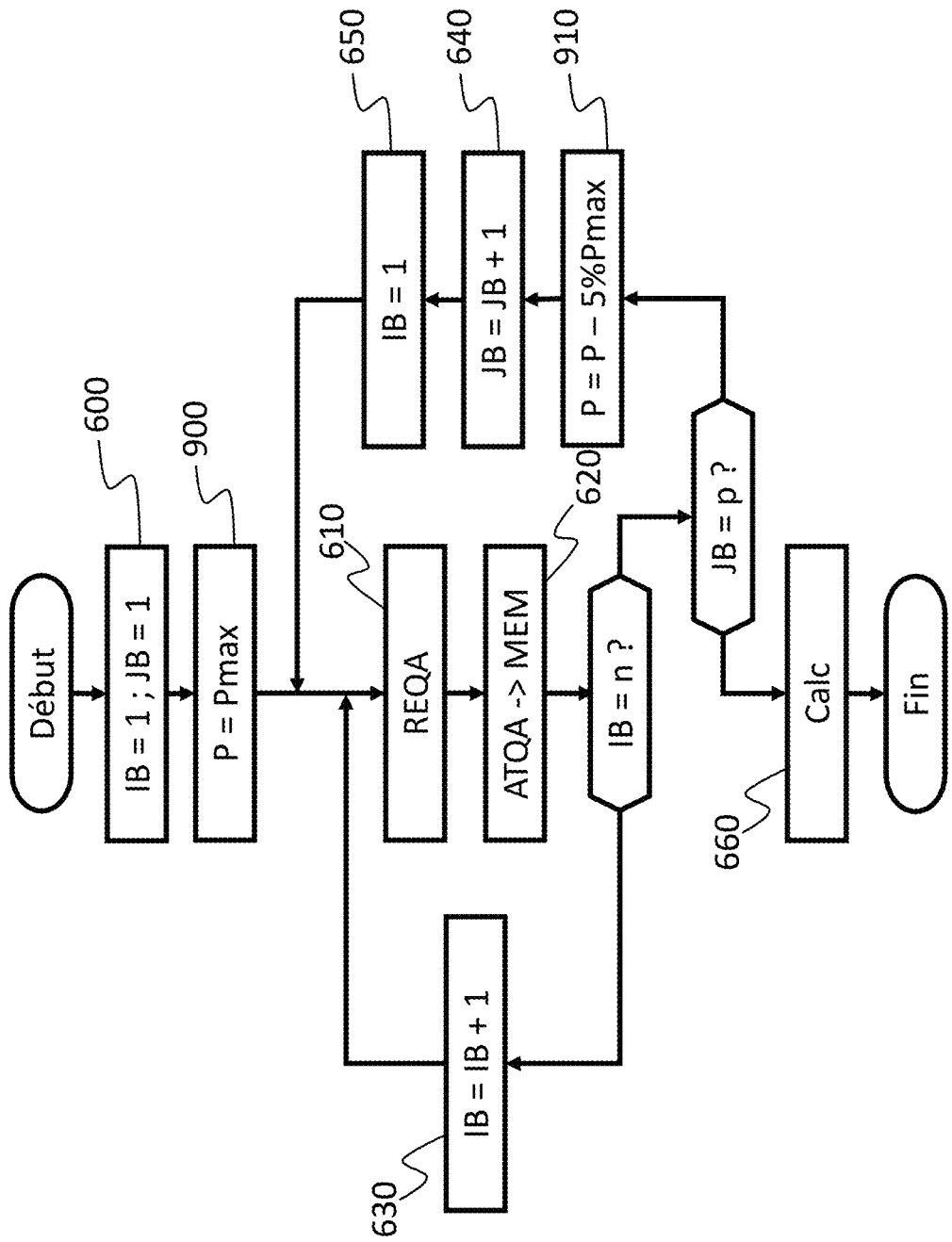
FIG. 9 is a functional flow diagram of a second embodiment of the method for locating electronic tags implemented by said surface, according to the invention.

In this improvement of the locating method, the processing unit 200 controls the transmission power of the MODEM circuit 110 so that each detection is performed at a different power. The locating method illustrated by FIG. 9 repeats the same steps as the method described in connection with FIG. 6, but adding a step 900 of initialization during which the processing unit 200 initializes the transmission power of the MODEM circuit 110 at a maximum power Pmax. By way of example, the maximum power is fixed in order to make it possible to detect a tag at up to twice the distance separating two antennas A1 to A8 that are adjacent to one another. The processing unit 200 then performs the steps 610 to 620 by means of each of the antennas A1 to A8. Then, during the incrementation of the index JB, the processing unit 200 reduces the transmission power of the MODEM circuit 110, in a step 910. By way of example, the power is reduced by five percent for a value "p" of the index JB that is equal to "10." A person skilled in the art could consider a maximum transmission power and a minimum transmission power, and perform a progressive reduction in the power of the maximum power to the minimum power, depending on the number of interrogations performed by each antenna, i.e. the value "p." According to a variant, it is possible to provide a step 900 consisting in initializing the transmission power at a minimum power, and a step 910 consisting in progressively increasing the power up to the maximum power.

Figure 10:
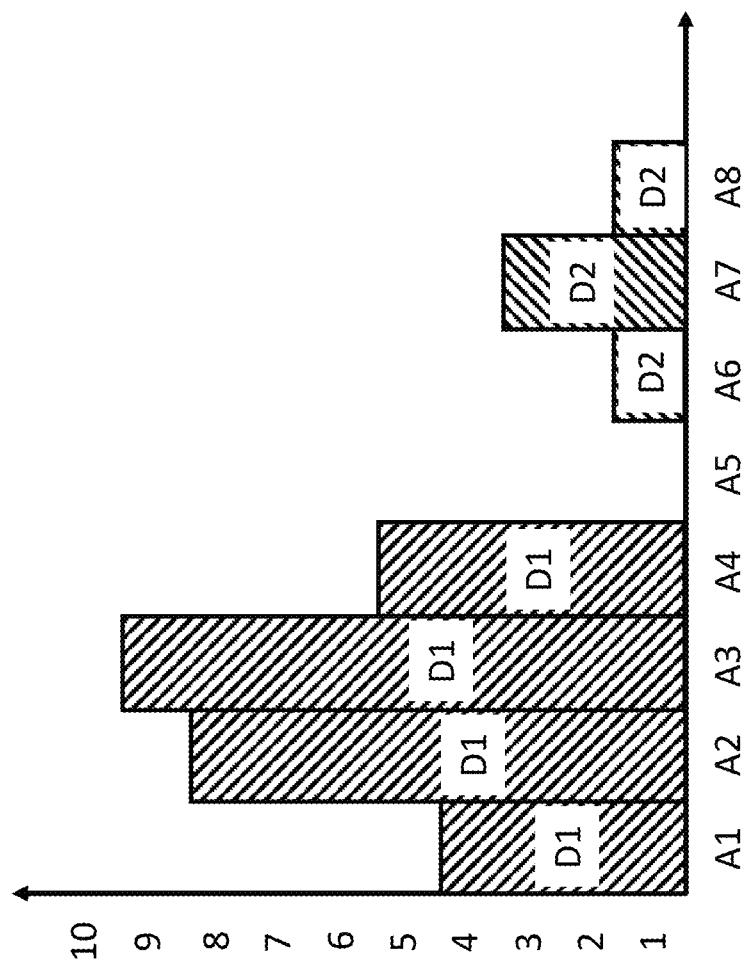
FIG. 10 illustrates counting of responses received, making it possible to locate electronic tags according to the method of FIG. 9.

FIG. 10 graphically shows, by way of non-limiting example, a number of ATQA responses received from said electronic tags D1 and D2 by each of the antennas A1 to A8. The antenna A1 has received four ATQA responses from the electronic tag D1, the antenna A2 has received eight ATQA responses from the electronic tag D1, the antenna A3 has received nine ATQA responses from the electronic tag D1, and the antenna A4 has received 5 ATQA responses from the tag D1. The antenna A6 has received one ATQA response from the electronic tag D2, the antenna A7 has received three ATQA responses from the electronic tag D2, and the antenna A8 has received one ATQA response from the electronic tag D2. In order to obtain the position of the electronic tag D1 or D2, the processing unit 200 calculates an average of the position of the antennas A1 to A8, weighted by the number of responses received, as explained above. By way of example, if the positions of antennas A1 to A8 are spaced apart by four centimeters, and the antenna A1 corresponds to the origin of the X axis, the positions x1 to x8 of the antennas A1 to A8 are positioned, respectively, at 0, 4, 8, 12, 16, 20, 24 and 28 centimeters from the origin. Considering the ATQA responses represented in FIG. 8, the position x(D1) is calculated at 6.31 centimeters from the origin, and the position x(D2) at 24 centimeters from the origin. A person skilled in the art may note that these measurements are different from but close to the measurements made above, with improved detection.

The methods described above require the performance of multiple instances of sending a command, using each of the antennas. In order to achieve a method that is quicker and just as simple to implement, the invention proposes measuring a response time of the tags in order to locate them.

The standard ISO14443 provides that a tag must send a response, after having received a command, within a time limit FDT (Frame Delay Time). The FDT is defined, in the standard ISO14443, as being the time separating the last modulation pulse of the reader, and the first modulation pulse of the electronic tag.

Figure 11:
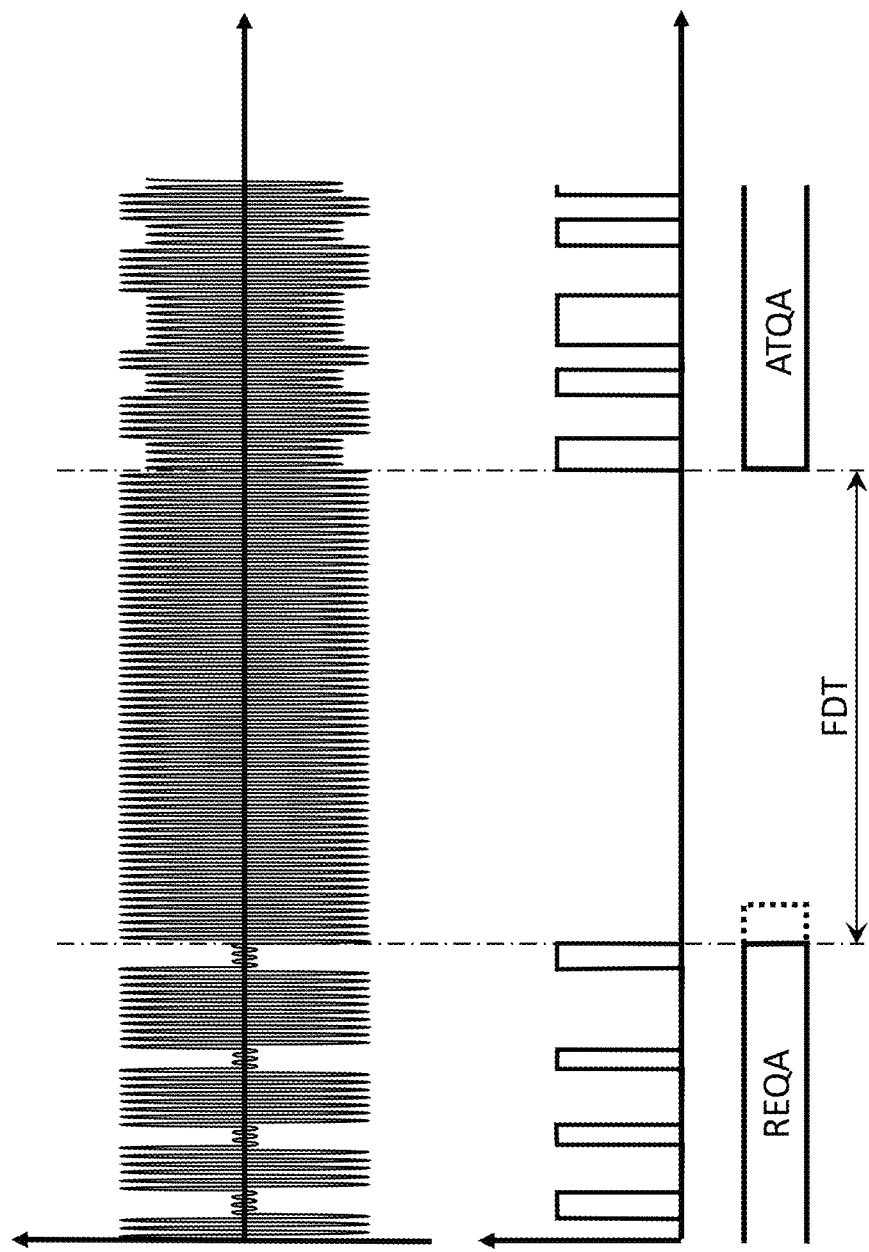
FIG. 11 illustrates a measurement of the response period of an electronic tag.

The top part of FIG. 11 shows a modulated magnetic field, and the bottom part of said figure shows the pulse trains modulating said field. An REQA command corresponds to a first period followed by an ATQA response corresponding to a second period. The base band modulation is achieved by pulses which are offset differently depending on whether the bit sent is a "0" or a "1." The measurement of the FDT is performed between the end of the last pulse of the REQA command modulated by the reader, and the start of the first pulse of the ATQA response modulated by the tag, as shown in FIG. 11. The last pulse of the REQA command can be produced at the end of or before the end of the REQA command, shown in dotted lines in FIG. 11, depending on the value of the last bit transmitted.

The standard ISO14443 defines the duration of the FDT in the number of periods of the frequency of the magnetic field. Depending on the value of the last bit modulated by the reader, this time period may be increased by an additional time period which corresponds to the end of the symbol. The number of periods of the FDT also depends on the command sent, such that the electronic tag can have time to respond to the command. By way of example, for an REQA command, the FDT period for sending the ATQA response is fixed at 1172 periods of the frequency of the magnetic field, plus 64 additional periods when the last bit is a "1." Moreover, the standard ISO14443 provides a tolerance for said FDT of +/−1 period for the reader, and of +0.4 microseconds for the electronic tag. For further details on the definition of the FDT, a person skilled in the art may refer to the standard ISO14443.

In practice, it is found that the reaction time for an NFC chip depends on the power of the magnetic field received, which is itself dependent on the distance from the antenna. Thus, the variation in the response time is representative of the distance separating the electronic tag from the antenna of the reader. Moreover, this variation takes place over a time period corresponding to +0.4 microseconds, or over 5.4 periods of the magnetic field. The FDT can be measured by simply counting the periods of the magnetic field. Such counting of periods is in particular performed in order to ascertain a lack of response.

Figure 12:
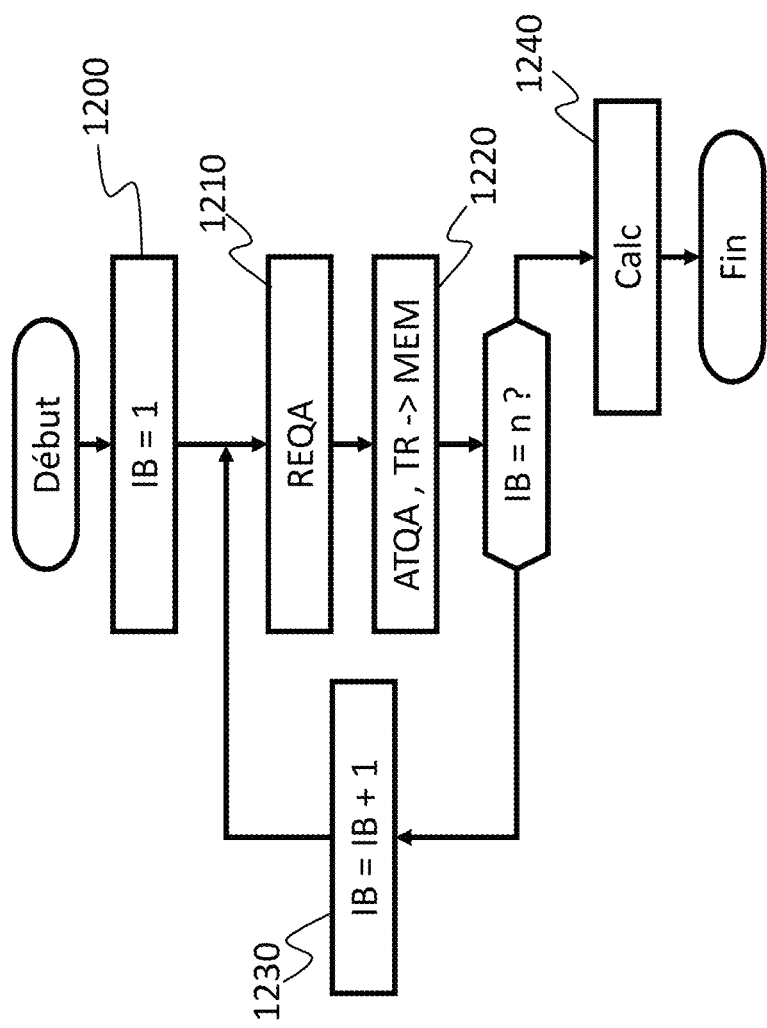
FIG. 12 is a functional flow diagram of a third embodiment of the method for locating electronic tags implemented by said surface, according to the invention.

FIG. 12 shows a method for measuring the position of an electronic tag using a response time measurement which is simple to implement. When the program corresponding to the method for locating tags is implemented by the processing unit 200, the processing unit initializes the method, in a step 1200, by setting one loop index IB to the value "1." Then, in a step 1210, the processing unit 200 controls the MODEM circuit 110 so as to send a command, for example REQA, at a specified power on an antenna A1 to An corresponding to the index IB, in order to receive an ATQA response indicating the identification number of the electronic tag. The specified transmission power is the same, or at least substantially the same, for all the antennas. During step 1220, when an ATQA response is received by an antenna A1 to An, the MODEM circuit 110 transmits the response, as well as a measurement of the response time TR, to a processing unit 200. The processing unit 200 memorizes the identifier of the electronic tag which has responded, the response time TR, and the index IB which corresponds to the antenna A1 to An which has received said ATQA response. The response time TR is for example measured in the number of periods of the magnetic field separating the last modulated pulse of the REQA command from the first pulse of the ATQA response.

The steps 1210 and 1220 are repeated following incrementation of the index IB, during a step 1230, until the index IB reaches a value "n" corresponding to the number of antennas A1 to An. When the steps 1210 and 1220 have been performed "n" times, the processing unit 200 performs a step 1240 of calculating the position of the detected tags.

In order to perform the calculation of the position, it is necessary to take account of the difference between the measured response time TR and an expected response time corresponding to the FDT. Furthermore, the shorter the response time, the smaller the distance between the tag and the maximum field of the antenna. A first approach could consist in determining a distance with respect to each antenna, depending on the difference between the measured response time TR and the expected response time FDT. Then, a triangulation process would make it possible to more precisely locate the position of the tag. However, an approach of this kind requires categorization of the response time of a tag, which can be achieved only if the circuit of the tag is known precisely.

In addition, the invention proposes a simple calculation method based on an average of the positions of the antennas weighted by the inverse of the difference between the measured response time and the expected response time. By way of example, for a network of antennas corresponding to FIG. 1, it is possible to use the following formula:

$$x(DJ) = \frac{\sum_{i=1}^{n}\left(\frac{1}{TRi(DJ)-FDT}*xi\right)}{\sum_{i=1}^{n}\left(\frac{1}{TRi(DJ)-FDT}\right)} \quad \text{[Math 4]}$$

where x(Dj) corresponds to the position of the tag Dj, n the number of antennas, TRi(Dj) the response time of the tag Dj measured by means of the antenna Ai, FDT the expected response time, and xi the position of the antenna Ai.

By way of example, FIG. 13 shows the differences between the measured response time and the expected response time for the electronic tags D1 and D2, positioned according to FIG. 1. The antenna A2 has made it possible to measure a delay of four periods for the ATQA response of the electronic tag D1, and the antenna A3 has made it possible to measure a delay of three periods for the ATQA response of the electronic tag D1. The antenna A6 has made it possible to measure a delay of four periods for the ATQA response of the electronic tag D2, the antenna A7 has made it possible to measure a delay of two periods for the ATQA response of the electronic tag D2, and the antenna A8 has made it possible to measure a delay of five periods for the ATQA response of the electronic tag D2.

By way of example, if the positions of antennas A1 to A8 are spaced apart by four centimeters, and the antenna A1 corresponds to the origin of the X axis, the positions x1 to x8 of the antennas A1 to A8 are positioned, respectively, at 0, 4, 8, 12, 16, 20, 24 and 28 centimeters from the origin. Considering the differences between the measured response time and the expected response time for the electronic tags D1 and D2 shown in FIG. 13, the position x(D1) is 6.29 centimeters from the origin, and the position x(D2) is 23.78 centimeters from the origin. A method of this kind has a margin of error which depends on the power of the magnetic field, the distance that can separate the surface are of the surface from the position of the tag, the orientation of the tag, and, more generally, the coupling coefficient between an antenna A1 to A8 of the communication surface 1 and an antenna of the electronic tag D1 or D2.

The calculation formula referring to the communication surface 1 of FIG. 1 can be adapted to the communication surface 1' of FIG. 2 or to the communication surface 1" of FIG. 3. In order to scan in rows and columns, it is possible to use two indices instead of the index IB in the method of FIG. 12, or to use a correspondence table for correspondences between a single index IB and each of the antennas.

By way of example, the formulas transposed for the communication surface 1' of FIG. 2 may for example be:

$$x(Dj) = \frac{\sum_{i=1}^{n}\sum_{k=1}^{m}\left(\frac{1}{TRik(DJ)-FDT}*xi\right)}{\sum_{i=1}^{n}\sum_{k=1}^{m}\left(\frac{1}{TRik(DJ)-FDT}\right)}; \quad \text{[math 5]}$$

$$y(Dj) = \frac{\sum_{i=1}^{n}\sum_{k=1}^{m}\left(\frac{1}{TRik(DJ)-FDT}*yk\right)}{\sum_{i=1}^{n}\sum_{k=1}^{m}\left(\frac{1}{TRik(DJ)-FDT}\right)}$$

where x(Dj) corresponds to the position of the tag Dj according to the first axis X, y(Dj) corresponds to the position of the tag Dj according to the second axis Y, n the number of antennas according to the first axis X, m the number of antennas according to the second axis Y, xi the position of the antenna Aik according to the first axis X, yk the position of the antenna Aik according to the second axis Y, and TRik(Dj) the response time of the tag Dj measured by means of the antenna Aik placed at position xi and yk, and FDT the expected response time.

By way of example, the formulas transposed for the communication surface 1' of FIG. 3 may for example be:

$$x(Dj) = \frac{\sum_{i=1}^{n}(TRCi(Dj)*xi)}{\sum_{i=1}^{n}TRCi(Dj)}; y(Dj) = \frac{\sum_{k=1}^{m}(TRLk(Dj)*yk)}{\sum_{k=1}^{m}TRLk(Dj)} \quad \text{[math 6]}$$

where x(Dj) corresponds to the position of the tag Dj according to the first axis X, y(Dj) corresponds to the position of the tag Dj according to the second axis Y, n the number of antennas according to the first axis X, m the number of antennas according to the second axis Y, xi the position of the antenna ACi according to the first axis X, yk the position of the antenna ALk according to the second axis Y, and TRCi(Dj) the response time of the tag Dj measured by means of the antenna ACi placed at position xi, TRLk(Dj) the response time of the tag Dj measured by means of the antenna ALk placed at position yk, and FDT the expected response time.

The locating method of FIG. 12 has been described having just one single electronic tag in the magnetic field of an antenna. It is also possible to apply the locating method when there are a plurality of electronic tags present in the magnetic field of one antenna Steps 1210 and 1220 have to be adapted as a result. As mentioned above, in the case of a plurality of tags being present in the field of one antenna of the communication surface, the ATQA response indicates a start of an identifier that is common to all the tags present in the magnetic field of the antenna. When a tag detects that the ATQA response does not comply with what it modulates, it stops the modulation. The processing unit 200 receiving, via the MODEM circuit 110, an incomplete identifier thus performs an anticollision loop as defined in the standard ISO14443, replacing steps 1210 and 1220. The processing unit 200 sends a selection command SEL containing the start of the identifier received, with an additional bit fixed at 1 then at 0 in order to select the lowest number of electronic tags. If just one tag is selected, the SAK response sent by the tag contains the identifier of the tag. Furthermore, the SAK response must be sent within an FDT after the SEL command, which is identical to the FDT following an ATQA response. If a plurality of electronic tags are selected, the SAK response is incomplete, and the selection operation is repeated on another bit of the identifier. The selection operation is thus repeated until there has been complete identification of all the tags present in the field of the antenna. The identifiers of the electronic tags are memorized together with the response times corresponding to the SAK responses which they have returned. At the end of the anticollision loop, the processing unit 200 can move on to step 1230 or 1240. For further details on the anticollision mechanism, a person skilled in the art may refer to the standard ISO14443.

The embodiments described have referred to contactless devices, referred to as Type A in the standard ISO14443. The devices of Type A correspond to electronic tags comprising a simplified electronic circuit which is intended only to return an identifier. The devices of Type A, on account of the low cost of the electronic circuit thereof, are frequently used for marking and identification of commercial products, and may also be frequently used in pieces of a game using a communicating game board. However, it is also possible to apply the position location by counting the number of responses to devices of Type B, using equivalent commands and anticollision management that is adapted to Type B. Indeed, steps 610 and 620 can be replaced by overall detection of the electronic tag of Type A or of Type B, the important question being that of identifying an electronic tag in the field of an antenna, and of counting the number of responses of each tag to each antenna.

In the same way, the method for locating by measuring the response time can also be applied to the devices of type B. However, the devices of Type B use response time windows. It is therefore necessary to take into account the time window used by an electronic tag for determining the expected response time. Steps 1210 and 1220 can be replaced by overall detection of electronic tags of Type B, step 1210 corresponding to sending an REQB command, and step 1220 corresponding to receiving one or more ATQB responses in one of the response time windows. The important question is that of identifying an electronic tag and measuring the response time thereof in the field of each antenna.

In the embodiments of FIGS. 2 and 3, the antennas are represented according to two perpendicular axes. A person skilled in the art will understand that it is not necessary to position these axes so as to be mutually perpendicular, and will be able to adapt the positioning of the axes, as needed. In the same way, the two axes are usually sufficient for locating a tag on a flat surface. In order to improve the precision of the locating, it is possible to use three or four secant axes.

The invention claimed is:

1. Near-field communication surface for communication with at least one electronic ID tag, said surface comprising:
 a plurality of antennas, each antenna having a position along a first axis which corresponds to maximum flux of the antenna according to said first axis;
 at least one circuit for reading electronic tags that is connected to said antennas in order to supply said antennas with power and communicate with said at least one electronic ID tag;
 a processing unit controlling the antennas and the at least one circuit for reading electronic tags, and configured to activate just one antenna at a time and said at least one reader circuit in order to communicate with said at least one electronic ID tag, wherein the processing unit is configured to send commands to at least one electronic ID tag by means of each of the antennas in order to locate a position of said at least one electronic ID tag along the first axis according to a number of responses or to a response time of said at least one electronic ID tag.

2. Near-field communication surface according to claim 1, wherein
 the processing unit is configured to
  send a predetermined number of commands to the at least one electronic ID tag via the at least one reader circuit and each of the antennas;
  count the number of responses received in response by each antenna; and
  calculate the position of the at least one electronic ID tag by averaging the positions of the antennas weighted by the number of responses received by each antenna.

3. Near-field communication surface according to claim 2, wherein the processing unit is configured to control the transmission power of said reader circuit such that the predetermined number of commands is sent by means of a predetermined number of transmission power.

4. Near-field communication surface according to claim 1, wherein the processing unit is configured to
 send at least one command to the at least one electronic ID tag having the same transmission power, via the at least one reader circuit and each of the antennas;

measure the response time of said at least one electronic ID tag for each antenna; and calculate the position of the at least one electronic ID tag according to a difference between the measured response time and an expected response time.

5. Near-field communication surface according to claim 4, wherein the processing unit is configured to calculate the position of the at least one electronic ID tag by averaging the positions of the antennas weighted by the inverse of a difference between the measured response time and the expected response time.

6. Near-field communication surface according to claim 1, wherein the communication surface further comprises:

a second plurality of antennas, each antenna having a position according to a second axis which corresponds to maximum flux of the antenna according to said second axis, the second axis being secant to the first axis, said second plurality of antennas being connected to the at least one circuit for reading electronic tags and controlled by the processing unit, and wherein the processing unit is configured to locate a position of said at least one electronic ID tag along the second axis according to a number of responses or to a response time of said at least one electronic ID tag.

7. Near-field communication surface according to claim 6, wherein the antennas of the first plurality are elongate in shape according to the second direction and the antennas of the second plurality are elongate in shape according to the first direction, said first and second pluralities of antennas covering a surface area that is substantially equal to a surface area of said surface and being superimposed, thus making it possible to locate the at least one electronic ID tag over the entirety of said surface according to the first and the second axis.

8. Near-field communication surface according to claim 1, wherein each antenna comprises at least one shunt switch which short-circuits the antenna when it is closed, and wherein, when an antenna is selected, the at least one shunt switch is open and, when an antenna is not selected, the at least one shunt switch is closed.

9. Near-field communication surface according to claim 1, wherein the at least one reader circuit comprises a single modulation and demodulation circuit connected to each antenna of the plurality of antennas, wherein each antenna comprises two connector switches for connecting it to the single reader circuit, and wherein, when an antenna is selected, the connector switches are closed and, when an antenna is not selected, the connector switches are open.

10. Method for locating an electronic ID tag on a near-field communication surface, said surface comprising a plurality of antennas, each antenna having a position according to an axis which corresponds to maximum flux of the antenna according to said axis, and at least one circuit for reading electronic tags that is connected to said antennas in order to supply said antennas with power and communicate with said electronic ID tag, wherein the method comprises:

sending a command to the electronic ID tag by means of a selected antenna from the plurality of antennas;

receiving a response from the electronic ID tag and memorizing the response or the lack of response of the tag, by the selected antenna;

repeating the steps of sending a command and receiving a response, until each of the plurality of antennas has sent at least one command; and calculating a position of the electronic ID tag according to a number of responses or to a response time of the electronic tag.

11. Method according to claim 10, wherein the steps of sending a command and receiving a response are repeated until each of the plurality of antennas has sent a predetermined number of commands to the electronic ID tag, wherein the step of receiving a response counts the number of responses received, and wherein the step of calculating the position of the electronic ID tag (D1, D2) determines the position of the electronic ID tag by averaging the positions of the antennas, weighted by the number of responses received.

12. Method according to claim 11, wherein the predetermined number of commands is sent by means of a predetermined number of transmission power.

13. Method according to claim 10, wherein the step of receiving a response measures the response time of said electronic ID tag, and wherein the step of calculating the position of the electronic ID tag determines the position of the electronic ID tag according to a difference between the measured response time and an expected response time.

14. Method according to claim 13, wherein the step of calculating the position of the electronic tag averages the antenna positions weighted by the inverse of a difference between the measured response time and the expected response time.

* * * * *